(12) United States Patent
Abelha Ferreira et al.

(10) Patent No.: US 11,521,017 B2
(45) Date of Patent: Dec. 6, 2022

(54) CONFIDENT PEAK-AWARE RESPONSE TIME ESTIMATION BY EXPLOITING TELEMETRY DATA FROM DIFFERENT SYSTEM CONFIGURATIONS

(71) Applicant: EMC IP Holding Company LLC, Hopkinton, MA (US)

(72) Inventors: Paulo Abelha Ferreira, Rio de Janeiro (BR); Adriana Bechara Prado, Niterói (BR); Pablo Nascimento da Silva, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 438 days.

(21) Appl. No.: 16/859,823

(22) Filed: Apr. 27, 2020

(65) Prior Publication Data

US 2021/0334597 A1   Oct. 28, 2021

(51) Int. Cl.
*G06K 9/00* (2022.01)
*G06K 9/62* (2022.01)
*G06N 20/20* (2019.01)
*G06N 5/02* (2006.01)

(52) U.S. Cl.
CPC .......... *G06K 9/6259* (2013.01); *G06K 9/6257* (2013.01); *G06K 9/6292* (2013.01); *G06N 5/025* (2013.01); *G06N 20/20* (2019.01)

(58) Field of Classification Search
CPC .. G06K 9/6259; G06K 9/6257; G06K 9/6292; G06N 20/20; G06N 5/025
See application file for complete search history.

(56) References Cited

U.S. PATENT DOCUMENTS

| | | | |
|---|---|---|---|
| 7,886,046 B1 * | 2/2011 | Zeitoun | H04L 41/145 706/56 |
| 10,915,830 B2 * | 2/2021 | Garvey | G06N 5/045 |
| 2017/0003948 A1 * | 1/2017 | Iyer | G06F 8/71 |
| 2021/0117822 A1 * | 4/2021 | Vishwakarma | G06N 7/005 |
| 2021/0303695 A1 * | 9/2021 | Grosse | G06F 17/18 |

* cited by examiner

*Primary Examiner* — Pakee Fang
(74) *Attorney, Agent, or Firm* — Chamberlain, Hrdlicka, White, Williams & Aughtry

(57) ABSTRACT

A prediction manager for providing responsiveness predictions for deployments includes persistent storage and a predictor. The persistent storage stores training data and conditioned training data. The predictor is programmed to obtain training data based on: a configuration of at least one deployment of the deployments, and a measured responsiveness of the at least one deployment, perform a peak extraction analysis on the measured responsiveness to obtain conditioned training data, obtain a prediction model using: the training data, and a first untrained prediction model, obtain a confidence prediction model using: the conditioned training data, and a second untrained prediction model, obtain a combined prediction using: the prediction model, and the confidence prediction model, and perform, based on the combined prediction, an action set to prevent a responsiveness failure.

14 Claims, 12 Drawing Sheets

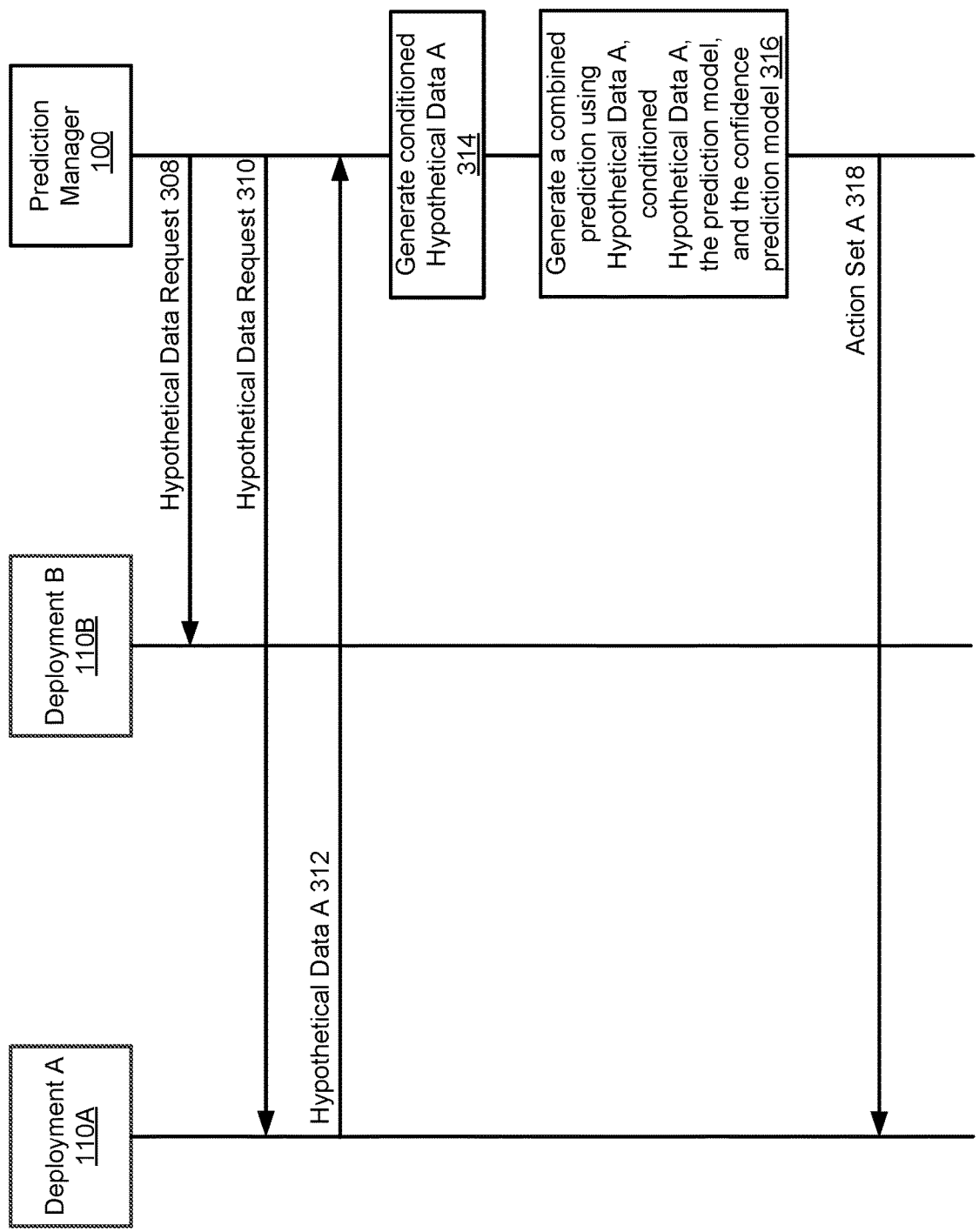

CONFIDENT PEAK-AWARE RESPONSE TIME ESTIMATION BY EXPLOITING TELEMETRY DATA FROM DIFFERENT SYSTEM CONFIGURATIONS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a prediction manager for providing responsiveness predictions for deployments in accordance with one or more embodiments of the invention includes persistent storage and a predictor. The persistent storage stores training data and conditioned training data. The predictor is programmed to obtain training data based on: a configuration of at least one deployment of the deployments, and a measured responsiveness of the at least one deployment, perform a peak extraction analysis on the measured responsiveness to obtain conditioned training data, obtain a prediction model using: the training data, and a first untrained prediction model, obtain a confidence prediction model using: the conditioned training data, and a second untrained prediction model, obtain a combined prediction using: the prediction model, and the confidence prediction model, and perform, based on the combined prediction, an action set to prevent a responsiveness failure.

In one aspect, a method for providing responsiveness predictions for deployments in accordance with one or more embodiments of the invention includes obtaining training data based on: a configuration of at least one deployment of the deployments, and a measured responsiveness of the at least one deployment, performing a peak extraction analysis on the measured responsiveness to obtain conditioned training data, obtaining a prediction model using: the training data, and a first untrained prediction model, obtaining a confidence prediction model using: the conditioned training data, and a second untrained prediction model, obtaining a combined prediction using: the prediction model, and the confidence prediction model, and performing, based on the combined prediction, an action set to prevent a responsiveness failure.

In one aspect a non-transitory computer readable medium in accordance with one or more embodiments of the invention includes computer readable program code, which when executed by a computer processor enables the computer processor to perform a method. The method includes obtaining training data based on: a configuration of at least one deployment of the deployments, and a measured responsiveness of the at least one deployment, performing a peak extraction analysis on the measured responsiveness to obtain conditioned training data, obtaining a prediction model using: the training data, and a first untrained prediction model, obtaining a confidence prediction model using: the conditioned training data, and a second untrained prediction model, obtaining a combined prediction using: the prediction model, and the confidence prediction model, and performing, based on the combined prediction, an action set to prevent a responsiveness failure.

BRIEF DESCRIPTION OF DRAWINGS

FIGS. 3B-3D show diagrams of actions performed by the example system of FIG. 3A over time in accordance with one or more embodiments of the invention.

DETAILED DESCRIPTION

Figure 1A:
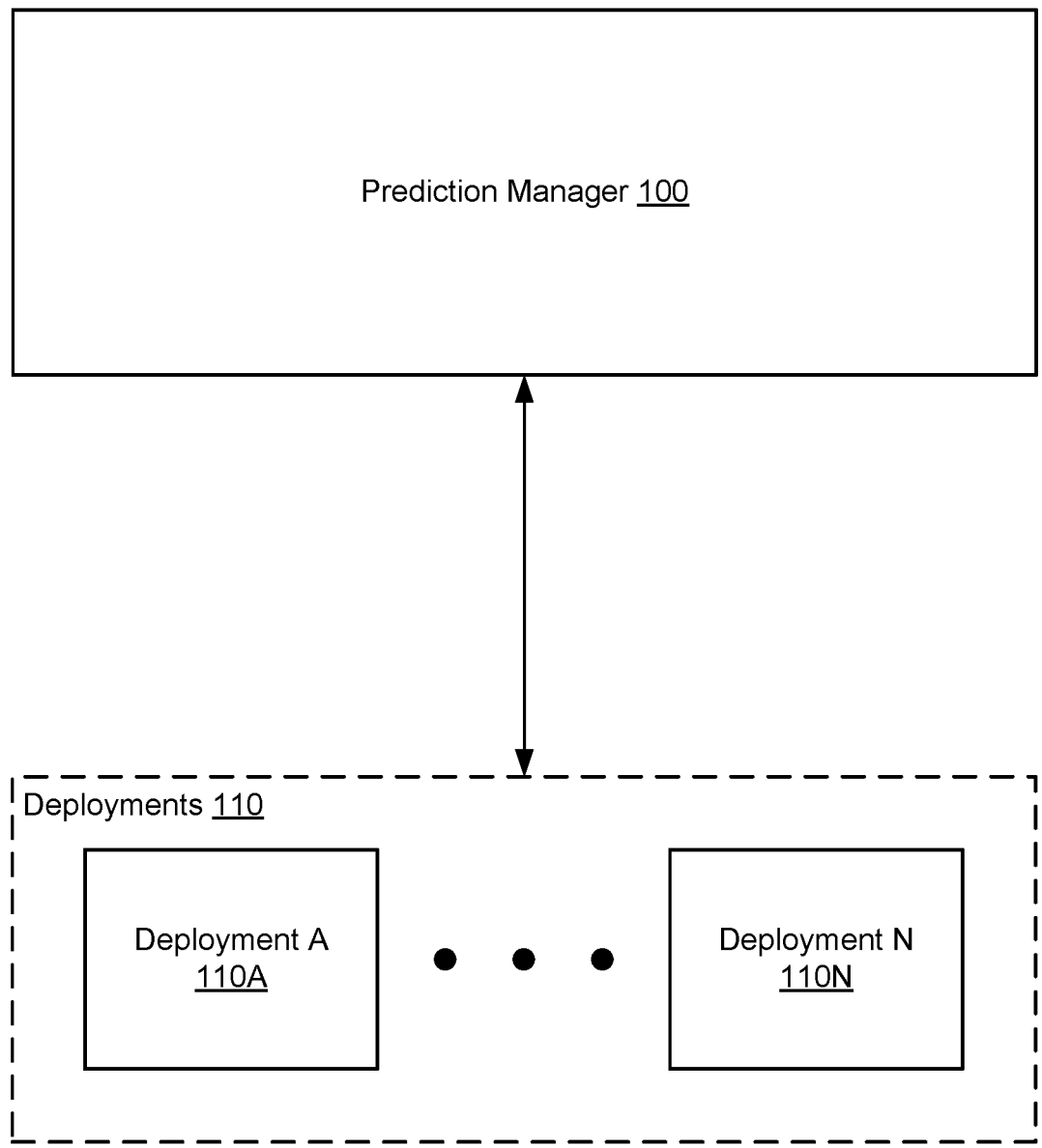
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for generating peak-aware predictions of response times of deployment configurations.

Specifically, a system in accordance with embodiments of the invention may generate peak-aware predictions of response times of hypothetical deployment configurations for given actions. The generated predictions may be used to determine whether a hypothetical deployment configuration meets the responsiveness requirements while taking into account peaks in response time. By doing so, the impact response time peaks in predicting the response time of hypothetical deployment configurations may be reduced and response time prediction reliability may be improved.

The system may generate combined predictions of hypothetical deployment configuration response times in a manner that is computationally efficient and reliable. To generate the confident peak-aware predictions, the system may utilize at least two prediction frameworks (e.g., trained machine learning models). The first of the prediction frameworks may generate predictions of response time. The second of the prediction frameworks may generate a confidence indicator prediction as to whether the predicted response time of the first prediction framework is a peak response time. Combined predictions may be generated using predicted response times and corresponding confidence indicator predictions and may include a predicted response time, a confidence indicator prediction, and a reliability indicator.

FIG. 1A shows a diagram of a system in accordance with one or more embodiments of the invention. The system may include deployments (110). The deployments (110) may provide computer implemented services to any number of entities. For example, client (not shown) may utilize the computer implemented services provided by the deployments (110). The services may include, for example, database, electronic communication, file storage, and/or any other type of computer implemented services.

One or more of the computer implemented services provided by the deployments (110) may require use of computing resources having particular characteristics. For example, one of the computer implemented service may require a certain level of responsiveness of storage resources. The responsiveness of the storage services may depend on a large number of factors including, for example, the number of storage devices, configurations of the storage device, storage architectures implemented by the storage devices, etc. Accordingly, it may be difficult to predict the actual responsiveness (or other types of characteristics) of deployments (110) and/or modify an existing deployment to provide computing resources having particular characteristics.

Embodiments of the invention may provide methods and systems for improving the likelihood that deployments are able to provide computing resources having particular characteristics necessary to meet demands for such resources. To do so, the system may (i) provide predictions of the characteristics (e.g., responsiveness) of hypothetical configurations and/or (ii) confidence indicators regarding the predictions. The confidence indicators may indicate the relative likelihood that a predicted characteristic will be present in an actual deployment similar to that of the hypothetical configuration. By doing so, deployments may be provided that provide or modified to provide characteristics required for computer implemented services.

To provide the above noted predictive functionality, the system may include a prediction manager (100). The prediction manager may generate and/or utilize predictions to improve the likelihood that deployments have desired characteristics. For example, the prediction manager (100) may specify requirements for a new deployment to have the desired characteristics and/or provide modification that may be applied to an existing deployment to change its characteristics to be consistent with desired and/or required characteristics.

The components of the system illustrated in FIG. 1A may be operably connected to each other and/or operably connected to other entities (not shown) via any combination of wired and/or wireless networks. Each component of the system illustrated in FIG. 1A is discussed below.

In one or more embodiments of the invention, the prediction manager (100) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-2C. The prediction manager (100) may be implemented using other types of computing devices without departing from the invention. For additional details regarding computing devices, refer to FIG. 4.

The prediction manager (100) may be implemented using logical devices without departing from the invention. For example, the prediction manager (100) may include virtual machines that utilize computing resources of any number of physical computing devices to provide the functionality of the prediction manager (100). The prediction manager (100) may be implemented using other types of logical devices without departing from the invention.

Prior to generating responsiveness predictions, the prediction manager (100) may obtain training data from one or more of the deployments (110), store the training data in persistent storage, and access the training data. The prediction manager (100) or one or more of the components therein, may use the training data to generate one or more prediction frameworks.

To generate responsiveness predictions, the prediction manager (100) may use multiple types of prediction frameworks. A first type of prediction framework may generate a response time prediction. A second type of prediction framework may generate a confidence indicator prediction that corresponds to the response time prediction of the first prediction framework that indicates the probability that the predicted response time is a peak response time. In one or more embodiments of the invention, the prediction manager (100) provides responsiveness prediction services to the deployments (110). Responsiveness prediction services may include (i) generation of prediction models, (ii) generation of responsiveness predictions for deployments (110), and (iii) performing and/or initiating actions to the deployments (110). The prediction manager (100) may provide other and/or additional services without departing from the invention. By doing so, the impact response time peaks in predicting the response time of deployments may be reduced and the reliability of responsiveness predictions may be improved. For additional information regarding the prediction manager (100), refer to FIG. 1B.

In one or more embodiments of the invention, deployments (110) obtain responsiveness prediction services from a prediction manager (100). The responsiveness prediction services may include generating combined predictions of response times for hypothetical configurations (not shown) of deployments (110). The responsiveness prediction services may include performing and/or initiating actions to the deployments (110). By using such services, data that may be relevant to the deployments (110) may be stored in persistent storage (e.g., 130, FIG. 1B) of the prediction manager (100).

In one or more embodiments of the invention, hypothetical configurations of deployments are configurations of deployments that have not been implemented in the deployments (110). A deployment configuration may refer to the hardware and software components a deployment uses to perform an action. The deployments (110) may have the ability to use more than one configuration without departing from the invention. Hypothetical configurations of deployments may be other types of deployment configurations without departing from the invention.

A deployment (e.g., 110A, 110N), or an entity that manages the deployments (not shown), may generate hypothetical configurations using a combination of components available to the deployment that have not been used together in a configuration in an attempt to meet responsiveness requirements of a new deployment that has not been deployed and/or improve the responsiveness of a deployment (e.g., 110A, 110N) currently deployed. The hypothetical configurations may be generated for other and/or additional purposes without departing from the invention.

In one or more embodiments of the invention, the deployments (110) obtain responsiveness prediction services from the prediction manager (100) as discussed above. The deployments (110) may obtain other and/or additional services without departing from the invention.

In one or more embodiments of the invention, the deployments (110) provide computer implemented services. The ability of the deployments (110) to provide the aforementioned computer implemented services depends, in part, on the response times of the deployments (110). The deployments (110A, 110N) may perform similar or different computer implemented services. There may be any number of deployments (e.g., 110A, 110N) in the system without departing from the invention. The deployments may provide other and/or additional services without departing from the invention.

For example, a first deployment (e.g., 110A) may provide computing functionality while a second deployment (e.g., 110N) may provide storage functionality. Any number of deployments (110) may perform similar or different computer implemented services without departing from the invention.

In one or more embodiments of the invention, each deployment includes any number of computing devices. Each of the computing devices may cooperatively work with the other computing devices to perform a predetermined function of the respective deployment. Similarly, each computing device may include any number of hardware and software components.

Each computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the deployments (110A, 110N) described in this application. For additional details regarding a computing device, See FIG. 4. For additional information regarding the deployments (110), refer to FIG. 1D.

Figure 1B:
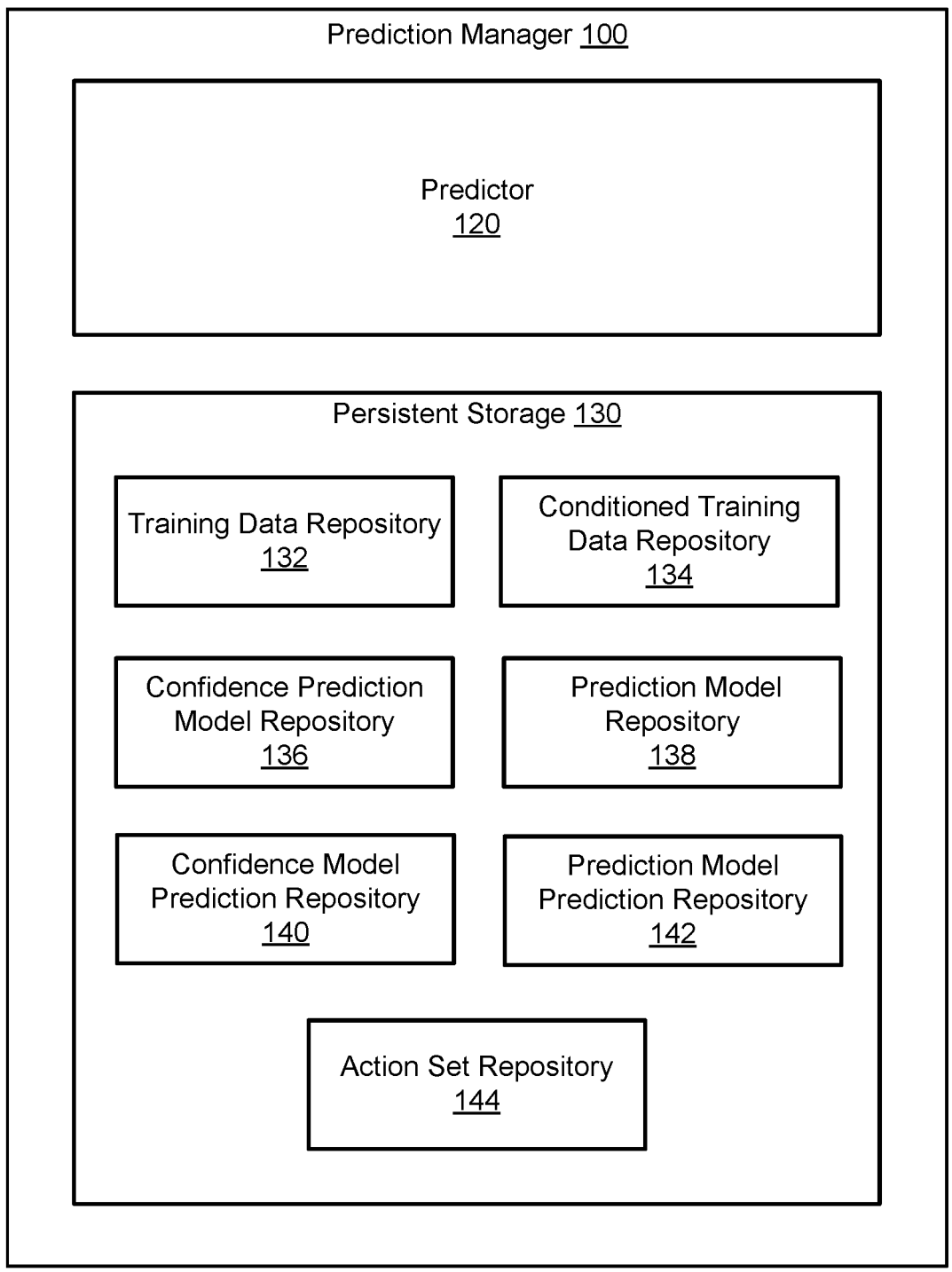
FIG. 1B. shows a diagram of a prediction manager in accordance with one or more embodiments of the invention.

FIG. 1B shows a diagram of a prediction manager (100) in accordance with one or more embodiments of the invention. The prediction manager (100) may be an embodiment of the prediction manager (100) discussed above in FIG. 1A. The prediction manager (100) may include a predictor (120) and persistent storage (130). The prediction manager may include other and/or additional components without departing from the invention. The components of the prediction manager (100) may be operably connected to each other and/or operably connected to other entities (not shown) via any combination of wired and/or wireless networks. Each component of the prediction manager (100) is discussed below.

In one or more embodiments of the invention, the predictor (120) is implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the predictor (120) described through this application and all, or a portion, of the methods illustrated in FIGS. 2A-2C. The predictor (120) may be implemented using other types of computing devices without departing from the invention. For additional details regarding computing devices, refer to FIG. 4.

The predictor (120) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the predictor (120) described throughout this application and/or all or a portion of the methods illustrated in FIGS. 2A-2C. The predictor (120) may be some other physical device without departing from the invention.

In one or more embodiments of the invention, the predictor (120) provides prediction generation services. The prediction generation services may include (i) generating a prediction model, (ii) generating a confidence prediction model, and (iii) generating combined predictions. The predictor (120) may provide other and/or additional services without departing from the invention. For additional information regarding the predictor, refer to FIG. 1C.

In one or more embodiments of the invention, the persistent storage (130) is implemented using a storage device. The storage device may be implemented using physical storage devices and/or logical storage devices. The persistent storage (130) may be implemented using other types of devices that provide data storage services without departing from the invention.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the persistent storage (130) provides data storage services to the predictor (120) and/or other entities. The data storage services may include storing of data and providing of previous stored data. The persistent storage (130) may provide other and/or additional services without departing from the invention.

The persistent storage (130) may store data structures including a training data repository (132), a conditioned training data repository (134), a confidence prediction model repository (136), a prediction model repository (138), a confidence prediction model prediction repository, prediction model prediction repository (142), and an action set repository (144). Each of these data structures is discussed below.

The training data repository (132) may be one or more data structures that may be used to generate prediction models and conditioned training data. The data may include information regarding the computing devices and the components of the deployments (110). The data may include, for example, deployment configurations, computational capabilities of configuration components, computer implemented services performed by the deployment configurations, number of read cycles, number of write cycles, percentage of sequential reads, measured response times, and timestamps. The training data repository (132) may include any quantity of data. The training data may be obtained from deployments (e.g., 110A, 110N) and/or an entity that manages the deployments (not shown). The predictor (120) may utilize the training data within the training data repository (132) to generate prediction models and conditioned training data. The predictor (120) may maintain the training data repository (132) by (i) obtaining training data from deployments, (ii) associating training data with timestamps, a prediction model generated using the obtained training data, and/or conditioned training data generated using the obtained training data, and (iii) storing training data in persistent storage. The training data repository (132) may include other and/or additional information without departing from the invention.

The conditioned training data repository (134) may be one or more data structures that may be used to generate confidence prediction models. The data included in the conditioned training data may include information regarding the computing devices and the components of the deployments (110). The data may include, for example, deployment configurations, computational capabilities of configuration components, actions performed by the deployment configurations, number of read cycles, number of write cycles, percentage of sequential reads, measured response times, and timestamps. The conditioned training data may further include training data that is partitioned to into two portions of training data, wherein one portion of the training data is more associated with of a specific quality of a computationally implemented service than the other portion of training data. The quality of computationally implemented service may be responsiveness. The conditioned training data repository (134) may include other and/or additional data without departing from the invention.

Accordingly, the conditioned training data repository (134) may include training data that has been divided into two portions: peak response times and non-peak response time through peak extraction analysis. The peak response times portion of the conditioned training data may include measured response times that were identified as peak response times by the data conditioner and data associated with such peak response times. Likewise, the non-peak response time portion of the conditioned training data may include measured response times that were not identified as peak response times by the data conditioner and the data associated with such response times. The conditioned training data may be generated by a data conditioner (see e.g., FIG. 1C) using training data. The predictor (120) may maintain the conditioned training data repository (134) by (i) generating conditioned training data from obtained training data, (ii) associating conditioned training data with a timestamp, a confidence prediction model generated using the conditioned training data, and/or the training data used to generate the conditioned training data, and (iii) storing the conditioned training data in persistent storage.

The confidence prediction model repository (136) may be one or more data structures that may be used to generate confidence indicator predictions that indicate the likelihood that a predicted response time of the prediction model is a peak response time. The confidence prediction model repository (136) may include one or more prediction frameworks for predicting confidence indicators. A prediction framework may be a confidence prediction model generated a machine learning algorithm. A confidence prediction model may be, for example, an ensemble of decision tress created using conditioned training data and a machine learning algorithm (e.g., the random forest machine learning algorithm). The confidence prediction models may be other prediction frameworks generated using conditioned training data that generate confidence indicator predictions without departing from the invention.

The predictor (120) may use the confidence prediction models of the confidence prediction model repository (136) to generate confidence indicator predictions as discussed above. The predictor (120) may maintain the confidence prediction model repository (136) by (i) generating confidence prediction models, (ii) associating confidence prediction models with a deployment configuration, a timestamp, conditioned training data used to generate the confidence prediction model, and/or confidence indicator predictions generated using the confidence prediction models, and (iii) storing the confidence prediction models in persistent storage.

The prediction model repository (138) may be one or more data structures that may be used to generate response time predictions as discussed above. The prediction model repository (138) may include one or more prediction frameworks that may be generated by the predictor (120). A prediction framework may be a prediction model generated using a machine learning regression algorithm. A prediction model may be, for example, a data structure created using training data and a machine learning algorithm (e.g., a multiple linear regression machine learning algorithm). The prediction models may be other prediction frameworks generated using training data that generate response time predictions without departing from the invention.

The predictor (120) may use the prediction models of the prediction model repository (138) to generate response time predictions as discussed above. The predictor (120) may maintain the prediction model repository (138) by (i) generating confidence prediction models, (ii) associating prediction models with a deployment configuration, a timestamp, training data used to generate the confidence prediction model, and/or response time predictions generated using the confidence prediction models, and (iii) storing the prediction models in persistent storage.

The confidence model prediction repository (140) may be one or more data structures that may be used to generate combined predictions. The confidence prediction model repository may include one or more confidence indicator predictions. The stored confidence indicator predictions within the confidence model prediction repository (140) may specify the likelihood that corresponding predicted response times are peak response times. The confidence indicator predictions may be one of three flags that indicate that the predicted response time is likely not a peak, could be a peak, or is likely not a peak respectively. The confidence indicator predictions may be a numerical percentage that indicate the probability that corresponding response time predictions are peak response times. The confidence indicator predictions may be other types of predictions that indicate the likelihood that corresponding response time predictions are peak response times without departing from the invention.

The confidence indicator predictions of the confidence model prediction repository (140) may be generated by the predictor (120) by introducing conditioned hypothetical data into confidence prediction models. The predictor (120) may maintain the confidence model prediction repository (140) by (i) generating confidence indicator predictions, (ii) associating confidence indicator predictions with a hypothetical deployment configuration, a timestamp, conditioned hypothetical data used to generate the confidence indicator prediction, and/or response time predictions associated with the generated confidence indicator predictions, and (iii) storing the confidence indicator predictions in persistent storage.

The prediction model prediction repository (142) may be one or more data structure that may be used to generate combined predictions. The prediction model prediction repository (148) may include any number of response time predictions. The response time predictions may be a numerical value associated with a unit of time to denote the predicted response times of hypothetical configurations performing a computer implemented service. The predicted response times may be associated with any unit of time without departing from the invention. The response time predictions may be other types of predictions that denote a predicted response time without departing from the invention.

The response time predictions of the prediction model prediction repository (142) may be generated by the predictor (120) by introducing hypothetical data into prediction models. The predictor (120) may maintain the prediction model prediction repository (142) by (i) generating response time predictions, (ii) associating response time predictions with a hypothetical deployment configuration, a timestamp, hypothetical data used to generate the response time predictions, and/or confidence indicator predictions associated with the generated response time predictions, and (iii) storing the response time predictions in persistent storage.

The combined predictions (not shown) may be one or more data structures that may be used to determine an action set of the action set repository (144) to perform and/or initiate. Each combined prediction may include both a response time prediction and a corresponding confidence indicator prediction. Each combined prediction may be associated with a hypothetical deployment configuration. The predictor (120) may use the combined predictions to determine whether the predicted response time is a reliable prediction and if the predicted response time exceeds a responsiveness threshold. The combined prediction may include other and/or additional information without departing from the invention.

The action set repository (144) may be one or more data structures that may be used to determine an action set to perform or initiate based on a combined prediction. The action set repository (144) may include sets of actions that the prediction manager (100) may perform and/or initiate based on the generated combined predictions. The sets of actions may be associated with different types of combined predictions that may be generated by the predictor (120). The set of actions may, for example, include (i) sending a message to a deployment or an entity that manages the deployments that includes the combined prediction and indicates that the predicted response time is a reliable prediction, (ii) sending a message to the deployments or an entity that manages the deployments requesting additional training data if the confidence indicator indicates that the predicted response time is an unreliable prediction, and (iii) sending a message to a deployment or an entity that manages the deployments that includes a warning that the predicted response time exceeds a responsiveness threshold. The action set repository (144) may include additional, different, and or fewer sets of actions without departing from the invention.

While the data structures (e.g., 132, 134, 136, 138, 140, 142, 144) are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (130), any of the aforementioned data structures may be stored in different locations (e.g., in persistent storage of other computing devices) and/or spanned across any number of computing devices without departing from the invention. Any of the aforementioned data structures may be implemented using, for example, lists, tables, linked lists, databases, and/or other types of data structures.

While the prediction manager (100) has been illustrated as including a limited number of specific components, a prediction manager in accordance with embodiments of the invention may include fewer, additional, and/or different components without departing from the invention.

Figure 1C:
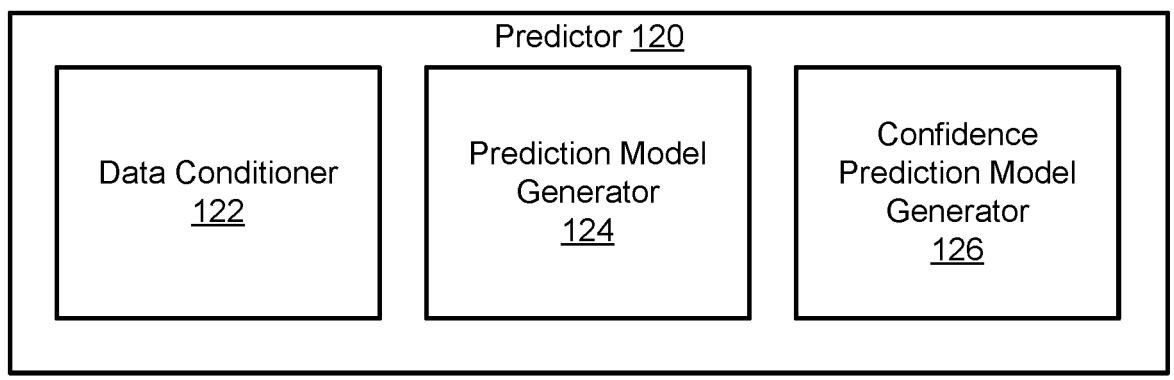
FIG. 1C shows a diagram of a predictor in accordance with one or more embodiments of the invention.

As discussed above, the predictor (120) may generate prediction models, confidence prediction models, and responsiveness predictions. FIG. 1C shows a diagram of a predictor (120) in accordance with one or more embodiments of the invention. The predictor (120) may be an embodiment of the predictor (120) discussed above in FIG. 1B. As discussed above, the predictor (120) may provide responsiveness prediction services for the prediction manager (100, FIG. 1A).

To provide the aforementioned functionality, the predictor (120) may include a data conditioner (122), a prediction model generator (124), and a confidence prediction model generator (126). Each of these components is discussed below.

The data conditioner (122) may provide data conditioning services for the predictor (120) and/or other entities. The data conditioning services may include peak extraction analysis. Peak extraction analysis may be used to divide the training data and hypothetical data into peaks and non-peaks to generate conditioned training data and conditioned hypothetical data to train the confidence prediction model and generate confidence indicator predictions. The data conditioning services may include (i) identifying a prediction threshold using previous predictions, (ii) identifying prediction peaks in the training data using the training data, and (iii) generating conditioned training data by dividing the training data into peaks and non-peaks. The data conditioner (122) may perform the same services on the hypothetical data in order to generate hypothetical conditioned data. The data conditioner may provide other and/or additional services without departing from the invention.

A peak may refer to a response time of a deployment configuration that is significantly higher than a majority of the response times of the deployment configuration. For example, a deployment configuration may have an average response time of five milliseconds and no response times above ten milliseconds. The next response time of the deployment configuration may be 200 milliseconds. The data conditioner (122) may identify the next response time as a peak response time.

In one or more embodiments of the invention, peak response times are narrow. More specifically, peak response times may occur sporadically. Peak response times may occur at irregular intervals and may be scattered or isolated.

The predicted response times generated by the prediction models may not be sensitive to peaks as the measured responsiveness included in the training data used to train the prediction models may include features that are not conducive to predicting peaks in response time. The data conditioner (122) may divide training data into peaks and non-peaks to generate conditioned training data and identify features in the training data and hypothetical data that are associated with peaks but that are obscured to the prediction models. The confidence prediction models may by trained by the conditioned training data and use conditioned hypothetical data to generate confidence indicators that specify the probability that a response time prediction generated by the prediction model is a peak response time.

In one or more embodiments of the invention, the data conditioner (122) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data conditioner (122) described throughout this application and/or all or a portion of the methods illustrated in FIGS. 2A-2C. The data conditioner (122) may be implemented using other types of physical devices without departing from the invention.

Figure 2A:
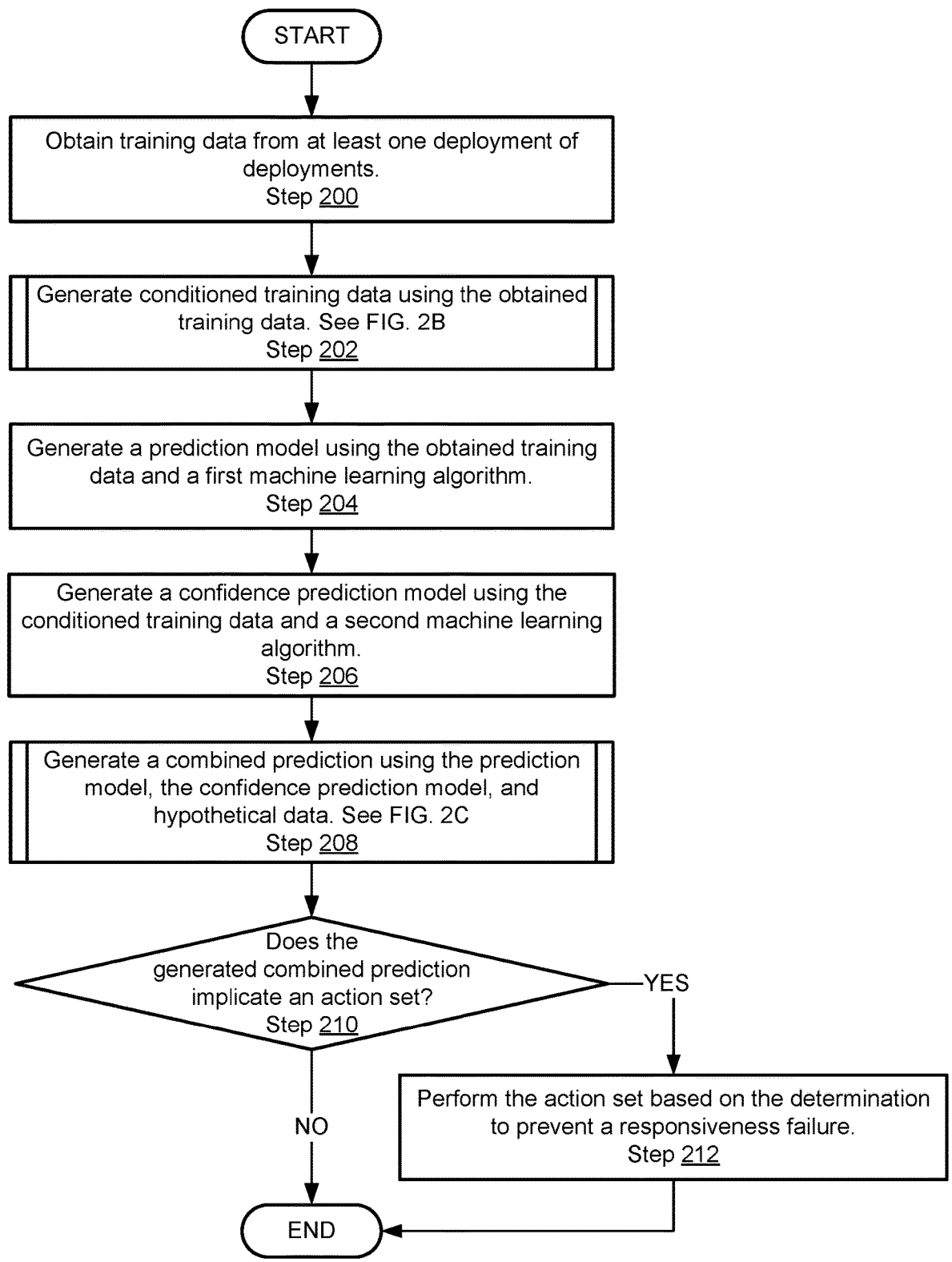
FIG. 2A shows a flowchart of a method of for providing responsiveness predictions for deployments in accordance with one or more embodiments of the invention.
Figure 2B:
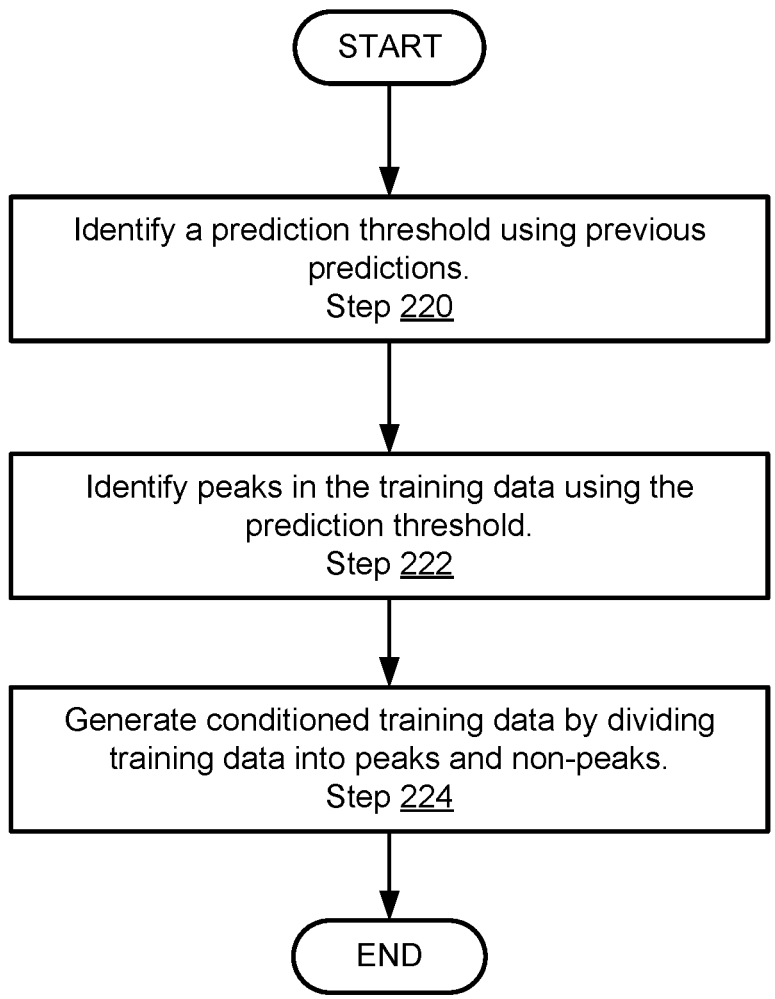
FIG. 2B shows a flowchart of a method of generating conditioned training data in accordance with one or more embodiments of the invention.
Figure 2C:
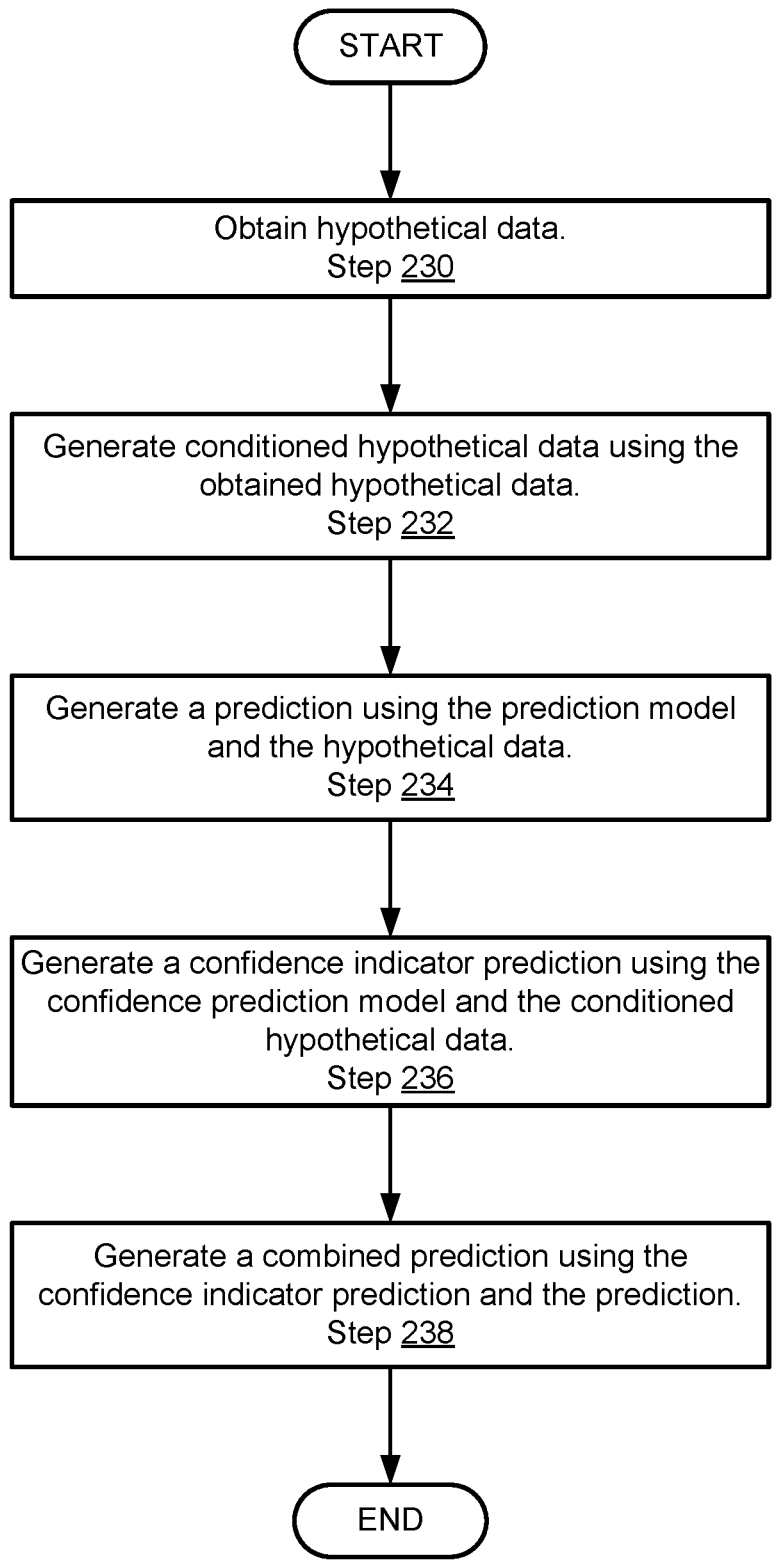
FIG. 2C shows a flowchart of a method for generating a combined prediction in accordance with one or more embodiments of the invention.

The data conditioner (122) may be implemented using computer instructions (e.g. computer code) stored on a persistent storage that when executed by a processor of the predictor (120) cause the predictor (120) to provide the functionality of the data conditioner (122) described throughout this application and/or all or a portion of the methods illustrated in FIGS. 2A-2C.

In one or more embodiments of the invention, the prediction model generator (124) provides prediction model generation services and response time prediction generation services for the predictor (120). The prediction model generation services may include (i) obtaining training data, and (ii) generating the prediction model using the training data and a machine learning regression algorithm. The machine learning regression algorithm may be multiple linear regression. The machine learning algorithm may be another algorithm without departing from the invention. The prediction model generator (124) may provide other and/or additional services without departing from the invention.

The response time prediction generation services may include obtaining hypothetical data from a deployment and/or other entity and using the aforementioned generated prediction model and the hypothetical data to generate a response time prediction. The hypothetical data may be obtained from a deployment (e.g., 110A) or another entity not depicted in the system shown in FIG. 1A. The hypothetical data may include information regarding a hypothetical deployment configuration that is currently not employed by a deployment as discussed above. The information may include components included in the hypothetical configuration, the components computational capabilities of each component, the storage capabilities of each component, and the action to be performed by the hypothetical configuration. The hypothetical data may include other and/or additional information regarding the hypothetical configuration of the deployment without departing from the invention.

In one or more embodiments of the invention, the prediction model generator (124) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the prediction model generator (124) described throughout this application and/or all or a portion of the methods illustrated in FIGS. 2A-2C. The prediction model generator (124) may include other types of physical devices without departing from the invention.

The prediction model generator (124) may be implemented using computer instructions (e.g. computer code) stored on a persistent storage that when executed by a processor of the predictor (120) cause the predictor (120) to provide the functionality of the prediction model generator (124) described throughout this application and/or all or a portion of the methods illustrated in FIGS. 2A-2C.

In one or more embodiments of the invention, the confidence prediction model generator (126) provides confidence prediction model generation services and confidence indicator prediction generation services for the predictor (120). The confidence prediction model generation services may include (i) obtaining conditioned training data generated by the data conditioner (122), and (ii) generating a confidence prediction model using the obtained conditioned training data and a machine learning classification algorithm. The machine learning classification algorithm may be the random forest machine learning algorithm. The machine learning classification algorithm may be another machine learning algorithm without departing from the invention. The confidence prediction model generator (126) may provide other and/or additional services without departing from the invention.

The confidence indicator prediction generation services may include (i) obtaining conditioned hypothetical data from the data conditioner (122) and (ii) generate a confidence indicator prediction using the aforementioned confidence prediction model and the conditioned hypothetical data.

In one or more embodiments of the invention, a confidence indicator prediction indicates the probability that a response time prediction is a peak response time. The confidence indicator may be one of three flags that indicate that the predicted response time is likely not a peak, could be a peak, or is likely not a peak respectively. The confidence indicator may be other and/or additional types of indicators without departing from the invention. The confidence indicator may indicate other and/or additional probabilities without departing from the invention.

In one or more embodiments of the invention, the confidence prediction model generator (126) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the confidence prediction model generator (126) described throughout this application and/or all or a portion of the methods illustrated in FIGS. 2A—2C. The confidence prediction model generator (126) may include other types of physical devices without departing from the invention.

The confidence prediction model generator (126) may be implemented using computer instructions (e.g. computer code) stored on a persistent storage that when executed by a processor of the predictor (120) cause the predictor (120) to provide the functionality of the confidence prediction model generator (126) described throughout this application and/or all or a portion of the methods illustrated in FIGS. 2A-2C.

While the predictor (120) of FIG. 1C has been described and illustrated as including a limited number of components for the sake of brevity, a predictor (e.g., 120) in accordance with embodiments of the invention may include additional, fewer, and/or different components than those illustrated in FIG. 1C without departing from the invention.

Figure 1D:
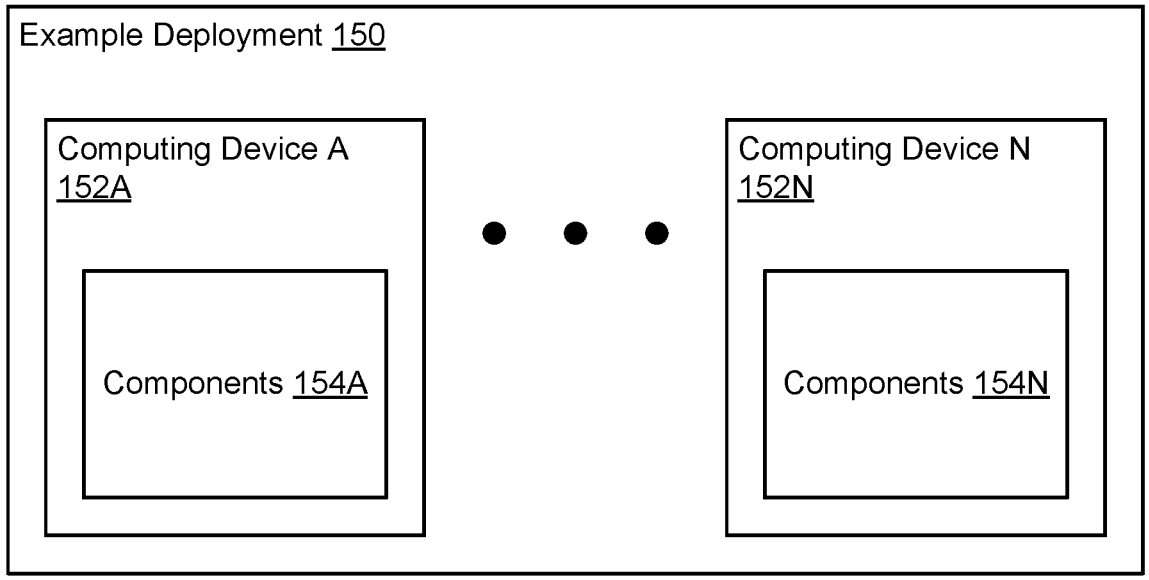
FIG. 1D shows a diagram of an example deployment in accordance with one or more embodiments of the invention.

As discussed above, deployments may utilize responsiveness prediction services provided by a prediction manager (e.g., 100, FIG. 1A). FIG. 1D shows a diagram of an example deployment (150) in accordance with one or more embodiments of the invention. The example deployment (150) may be an embodiment of the deployments (e.g., 110A, 110N) discussed above in FIG. 1A. Utilizing the responsiveness prediction services may include (i) providing data to the prediction manager (100, FIG. 1A) such as telemetry data, (ii) obtaining predictions from the prediction manager (100, FIG. 1A), and (iii) performing actions based on the predictions. The performance of the actions may modify the responsiveness of the example deployment (150) to meet requirements of one or more of the components of the example deployment (150).

As discussed above, the example deployment (150) may perform one or more predetermined computer implemented services or actions. For example, the example deployment (150) may provide storage functionality to an entity not shown in the system depicted in FIG. 1A. The example deployment (150) may perform other and/or additional functionalities without departing from the invention.

In one or more embodiments of the invention, the example deployment (150) includes any number of computing devices (152A, 152N). Each of the computing devices may cooperatively work with all, or a portion, of the other computing devices to perform one or more predetermined computer implemented services of the example deployment (150).

Each computing device (152A, 152N) may be implemented using a mobile phone, a tablet computer, a laptop computer, a desktop computer, a server, or a cloud resource. Similarly, each computing device (152A, 152N) may include any number of hardware and software components (e.g., 154A, 154N). The hardware components may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform one or more of the computer implemented services of the example deployment (150) described in this application. For additional details regarding a computing device, See FIG. 4.

While illustrated as including a limited number of specific components, a deployment in accordance with embodiments of the invention may include additional, fewer, and/or different components without departing from the invention.

As discussed above, the prediction manager in accordance with embodiments of the invention may generate prediction models, confidence prediction models, and combined predictions in order to predict the responsiveness of hypothetical deployment configurations. FIGS. 2A-2C show methods that may be performed by the prediction manager when providing responsiveness prediction services.

FIG. 2A shows a flowchart of a method in accordance with one or more embodiments of the invention. The method depicted in FIG. 2A may be used to provide responsiveness prediction services in accordance with one or more embodiments of the invention. The method depicted in FIG. 2A may be performed by, for example, the prediction manager (e.g., 100, FIG. 1A). Other components of the system illustrated in FIG. 1A may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention. Additionally, any step in the method depicted in FIG. 2A may be performed any number of times without departing from the invention.

In step 200, training data is obtained from at least one deployment of the deployments.

The prediction manager may send a request for training data to one or more of the deployments. The deployments may maintain data regarding the configuration(s) of the deployment. In response to the request, one or more of the deployments may send the maintained data regarding the deployment configuration(s) as training data to the prediction manager. The training data may include deployment configuration(s), measured response times of deployment configuration(s), actions performed by the deployment(s), timestamps, and computational capabilities of the components of the configuration(s) as discussed above. The training data may include other and/or additional data regarding the deployment configuration(s) without departing from the invention. The training data may be obtained using other and/or additional methods without departing from the invention.

In step 202, conditioned training data is generated using the obtained training data.

In one or more embodiments of the invention, the conditioned data is generated by performing peak extraction analysis on the training data. Peak extraction analysis includes dividing the training data into data associated with peak response times and data associated with non-peak response times as discussed above. The data conditioner of the prediction manager may use a prediction threshold to identify peaks in measured response times and prior response time predictions. Based on the identification, all training data associated with the response time peaks may be placed in one data structure and all training data associated with non-peak response times may be placed in another data structure to generate the conditioned training data. The conditioned training data may be generated via other and/or additional methods without departing from the invention. For additional information regarding generating conditioned training data, refer to FIG. 2B In step 204, a prediction model is generated using the obtained training data and a first prediction framework.

In one or more embodiments of the invention, the predictor obtains the training data and introduces the training data to a first prediction framework to generate the prediction model. The first prediction framework may be a machine learning algorithm. The machine learning algorithm may be, for example, a multiple linear regression machine learning algorithm. The multiple linear regression machine learning algorithm, when operating on the training data, may generate a data structure that establishes one or more functional relationships between input variables and measured response times included the training data through multiple linear regression analysis. The input variables may be deployment configurations, computational capabilities of components of deployment configurations, actions performed by deployments, etc. as discussed above. The input variables may be other variables regarding deployment configurations without departing from the invention.

The generated data structure may be used, in accordance with the prediction model, to generate response time predictions for inputs of hypothetical deployment configuration data (i.e., hypothetical data). The prediction model may be generated via other and/or additional methods without departing from the invention. For example, different types of prediction frameworks may be used to generate corresponding data structures that may in turn be used to generate response time predictions without departing from the invention.

In step 206, a confidence prediction model is generated using the conditioned training data and a second prediction framework.

In one or more embodiments of the invention, the predictor obtains the conditioned training data and introduces the conditioned training data to a second prediction framework to generate the confidence prediction model. The second prediction framework may be a machine learning algorithm. The machine learning algorithm may be, for example, the random forest algorithm. The random forest algorithm, when operating on the conditioned training data, may generate an ensemble of decision trees, each: (i) reflecting a subset of features included in the conditioned training data and (ii) generating a confidence indicator prediction. The generated decision trees may be used, in accordance with the model, to generate confidence indicator predictions. The confidence prediction model may be generated via other and/or additional methods without departing from the invention. For example, different types of prediction frameworks may be utilized to generate corresponding data structures that may be used to generate confidence indicator predictions without departing from the invention.

In step 208, a combined prediction is generated using the prediction model, the confidence prediction model, and hypothetical data.

In one or more embodiments of the invention, the predictor uses hypothetical data, the prediction model, and the confidence prediction model to generate the combined prediction.

The prediction manager may send a message to a deployment or an entity that manages the deployments that includes a request for the hypothetical data. In response to the request, the deployment or an entity that manages the deployments may then generate and/or send the hypothetical data to the prediction manager. The hypothetical data may include data regarding a hypothetical configuration of a deployment for which a combined prediction is to be generated. The hypothetical data may include a subset of features included in the training data. For example, the hypothetical data may include a hypothetical deployment configuration, computational capability information, and an action to be performed by the hypothetical configuration. The hypothetical data may not include measured response times.

After obtaining the hypothetical data, the predictor may generate the conditioned hypothetical data (i.e., hypothetical data that is associated with peak response times and non-peak response times) using the hypothetical data. The hypothetical data and a prediction model may then be used to generate a response time prediction. Similarly, conditioned hypothetical data and a confidence prediction model may then be used to generate a response time prediction. Similarly, conditioned hypothetical data and a confidence prediction model may be used to generate a confidence indicator prediction. The combined prediction may be generated by reading both the response time prediction and the confidence indicator prediction. The combined prediction may be generated via other and/or or additional methods without departing from the invention. For additional information regarding generating the combined prediction, refer to FIG. 2C.

In step 210, it is determined whether the combined prediction implicates an action set.

In one or more embodiments of the invention, the prediction manager accesses the action set repository and uses the combined prediction to determine if an action set is implicated. An action set may be implicated if the combined prediction indicates that the predicted response time exceeds a responsiveness threshold, or the combined prediction indicates that the prediction is unreliable due to the confidence indicator prediction. The responsiveness threshold may be a numerical value that depicts the maximum allowable response time to perform a computer implemented service for a hypothetical deployment configuration. The responsiveness threshold may be obtained from a deployment or an entity that manages the deployments. It may be determined that the combined prediction indicates an action set via other and/or additional methods without departing from the invention.

If it is determined the combined prediction implicates an actions, the method may proceed to step 212. If it is determined the combined prediction does not implicate an action set, the method may end following step 210.

In step 212, the action set is performed based on the determination to prevent a responsiveness failure.

As discussed above, the combined prediction may implicate an action set. The prediction manager may perform the implicated action set based on the combined prediction. The prediction manager may send a message to other entities to initiate the performance of an action set by the other entities. The performance of the action set may result in a modification of a deployment or a hypothetical deployment configuration. The modification of the hypothetical deployment configuration may result in an improvement of the responsiveness of the deployment or hypothetical deployment in order to prevent responsiveness failures. The action set may be performed based on the combined prediction via other and/or additional methods without departing from the invention.

For example, the combined prediction may include a predicted response time that exceeds a threshold. In response to the predicted response time exceeding a threshold, the prediction manager may send a message to the entity from which the hypothetical data was obtained (i.e., a deployment or an entity that manages the deployments) indicating that the hypothetical deployment configuration is not predicted to predicted response time exceeds a responsiveness threshold. Alternatively, the combined prediction may include a confidence indicator prediction that indicates the predicted response time is unreliable. In response to the confidence indicator prediction, the prediction manager may send a message to the entity from which the hypothetical data was obtained (i.e., a deployment or an entity that manages the deployments) indicating that the predicted response time is unreliable and requesting more training data to improve the predictive capabilities of the prediction manager.

The method may end following step 212.

As discussed above, the predictor may generate conditioned training data using the method illustrated in FIG. 2B. FIG. 2B shows a flowchart of a method in accordance with one or more embodiments of the invention. The method depicted in FIG. 2B may be used to generate conditioned training data that may be used by the prediction manager to generate confidence prediction models in accordance with one or more embodiments of the invention. The method shown in FIG. 2B may be performed by, for example, a prediction manager (100, FIG. 1A). Other components of the system illustrated in FIG. 1A may perform all, or a portion of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, a prediction threshold is identified using previous predictions.

The data conditioner of the predictor may obtain previous predictions from the prediction model prediction repository (and/or may obtain measured response times from deployments) and identify predictions that are significantly higher than the majority of other predictions. The lowest of these predictions that are significantly higher than the other predictions may be identified by the data conditioner as a prediction threshold. A prediction threshold may be a response time above which predicted response times are considered peak response times. The prediction threshold may be, for example, a numerical value that coincides with a unit in time that above which may be identified as a peak response time. The prediction threshold may be another type of threshold that denotes a peak response time without departing from the invention. The prediction threshold may be identified via other and/or additional methods without departing from the invention.

For example, predictions from the prediction repository may have an average response time prediction of ten milliseconds. The predictions may include five predictions above the average, with two of the five being equal to and above 200 milliseconds and the other three predictions being below 20 milliseconds. In this example, the data conditioner may recognize the two predictions over 200 milliseconds as significantly higher than the other predictions and may identify 200 milliseconds as the prediction threshold.

In step 222, peaks are identified in the training data using the prediction threshold.

In one or more embodiments of the invention, the data conditioner of the predictor identifies all measured response times included in the training data that are above the prediction threshold as peaks. As discussed above, the training data may include measured response times of deployment configurations. The data conditioner may compare the measured response times with the prediction threshold and identify all measured response times that are above the prediction threshold as peak response times. Peaks may be identified in the training data using the prediction threshold via other and/or additional methods without departing from the invention.

In step 224, conditioned training data is generated by dividing the training data into peaks and non-peaks.

The data conditioner may generate conditioned training data by generating a peak data structure and a non-peak data structure. The peak data structure may include the identified peak measured response times of the training data. The peak data structure may also include all of the training data associated with identified peak measured response times (e.g., deployment configuration, computational capabilities of the components in the deployment, etc.). The peak data structure may include other and/or additional information regarding the identified peak measured response times without departing from the invention.

The non-peak data structure may include the measured response times that were not identified as peak response times. The non-peak data structure may include all of the training data associated with the identified non-peak measured response times (e.g., deployment configuration, computational capabilities of the components in the deployment, etc). The non-peak data structure may include other and/or additional information regarding the identified peak measured response times without departing from the invention. The conditioned training data may comprise both the peak data structure and the non-peak data structure. The conditioned training data may be generated via other and/or additional methods without departing from the invention.

The method may end following step 224.

As discussed above, the predictor may generate a combined prediction using the method illustrated in FIG. 2C. FIG. 2C shows a flowchart of a method in accordance with one or more embodiments of the invention. The method depicted in FIG. 2C may be used to generate a combined prediction that indicates a predicted response time of a hypothetical configuration, a confidence indicator that indicates the probability that the predicted response time is a peak response time, and a reliability indicator that indicates the reliability of the response time prediction in accordance with one or more embodiments of the invention. The method in FIG. 2C may be performed by the prediction manager (100, FIG. 1A). Other components of the system illustrated in FIG. 1A may perform all, or a portion, of the method of FIG. 2C without departing from the invention.

While FIG. 2C is illustrated as a series of steps, any of the steps may be omitted, performed in a different order, additional steps may be included, and/or any or all of the steps may be performed in a parallel and/or partially overlapping manner without departing from the invention.

In step 230, hypothetical data is obtained.

In one or more embodiments of the invention, hypothetical data associated with a hypothetical deployment configuration may be obtained from an entity not shown in the system depicted in FIG. 1A. The prediction manager may send a request to the entity. In response to the request, the entity may send hypothetical data to the prediction manager. The entity may generate hypothetical deployment configurations for a new deployment not currently deployed in order to meet responsiveness requirements for computer implemented services performed by the hypothetical deployment configuration. Hypothetical configurations may be generated for other and/or additional purposes without departing from the invention. The entity may send the hypothetical data to the prediction manager to predict the responsiveness of the hypothetical configuration.

In one or more embodiments of the invention, the hypothetical data associated with a hypothetical deployment configuration may be obtained from a deployment of the deployments or another entity(ies) (not shown in the system of FIG. 1A) that manages the deployments. The prediction manager may send a request to a deployment. In response to the request, the deployment may send hypothetical data to the prediction manager. The deployments may have the ability to use more than one configuration without departing from the invention. A deployment or an entity that manages the deployments may generate hypothetical configurations using a combination of components available to the deployment that have not previously been used together in a configuration in an attempt to improve the responsiveness of the deployment. The hypothetical configurations may be generated for other and/or additional purposes without departing from the invention. The deployment, or the entity that manages the deployments, may send the hypothetical data to the prediction manager to determine whether the hypothetical deployment configuration improves the responsiveness of the deployment. Hypothetical data may be obtained via other and/or additional methods without departing from the invention.

In one or more embodiments of the invention, the hypothetical data includes data regarding a hypothetical configuration of a deployment. The hypothetical data may include components included in the hypothetical configuration, the computational capabilities of the components, the computer implemented services performed by the hypothetical configuration, and/or the responsiveness requirement (i.e., a responsiveness threshold) of the hypothetical configuration. The hypothetical data may include other and/or additional data regarding the hypothetical data without departing from the invention.

In step 232, conditioned hypothetical data is generated using the hypothetical data.

In one or more embodiments of the invention, the conditioned hypothetical data is generated by dividing the hypothetical data into data associated with peak response times and data associated with non-peak response times as discussed above. The hypothetical data may not include measured response times. The data conditioner of the prediction manager may use previously generated conditioned training data and response time predictions to divide similar hypothetical data into one data structure that includes hypothetical data associated with peaks and another data structure that includes hypothetical data not associated with peaks. The conditioned hypothetical data may be generated via other and/or additional methods without departing from the invention.

In step 234, a prediction is generated using the prediction model and the hypothetical data.

The predictor of the prediction manager may introduce the hypothetical data into the prediction model. In other words, the prediction model may use the hypothetical data as inputs and produce a response time prediction as an output. The prediction may be a response time prediction. The response time prediction may be a numerical value associated with a unit of milliseconds to denote the response time prediction. The prediction may be associated with any unit of time without departing from the invention. The prediction may be another type of prediction that denotes a predicted response time without departing from the invention. The prediction may be generated via other and/or additional methods without departing from the invention.

In step 236, a confidence indicator prediction is generated using the confidence prediction model and the conditioned hypothetical data.

The predictor of the prediction manager may introduce the conditioned hypothetical data into the confidence prediction model. In other words, the confidence prediction model may use the conditioned hypothetical data as inputs and produce a confidence indicator prediction as an output. The confidence indicator prediction may be that the predicted response time is likely a non-peak response time, possibly a non-peak response time, possibly a peak response time, or likely a peak response time. The confidence indicator prediction may be associated with a probability. For example, the confidence indicator prediction may a numerical percentage as to whether the predicted response time is a peak response time. The confidence indicator prediction may be another type of prediction that indicates the likelihood the predicted response is a peak and/or a non-peak response time without departing from the invention. The confidence indicator prediction may be generated via other and/or additional methods without departing from the invention.

In step 238, a combined prediction is generated using the confidence indicator prediction and the prediction.

In one or more embodiments of the invention, the combined prediction is generated by reading both the response time prediction and the confidence indicator prediction. Using both the response time prediction and the confidence indicator prediction, the prediction manager may generate a combined prediction that indicates whether the predicted response time is a reliable prediction that may accurately reflect a potential measured response time of the hypothetical deployment configuration. The combined prediction may also indicate whether the predicted response time exceeds a responsiveness threshold. The combined prediction may be generated via other and/or additional methods without departing from the invention.

For example, the prediction response time generated by the prediction model may be a high response time that exceeds an associated responsiveness threshold, and the confidence indicator prediction generated by the confidence prediction model may indicate that the response time prediction is likely a peak. Based on the predicted response time and the confidence indicator prediction, the generated combined prediction may indicate that the predicted response time is a reliable prediction and the predicted response time exceeds the responsiveness threshold.

Alternatively, in a second example, the predicted response time generated by the prediction model may not exceed a responsiveness threshold and may be a low response time compared to measured response times and previous response time predictions. However, the confidence indicator prediction generated by the confidence prediction model may indicate that the generated response time is likely a peak response time. In this example, the low response time prediction may not be reflected by the confidence indicator prediction that the response time is likely a peak response time. Based on the predicted response time prediction and the confidence indicator prediction, the generated combined prediction may indicate that the predicted response time is an unreliable prediction.

The method may end following step 238.

Figure 3A:
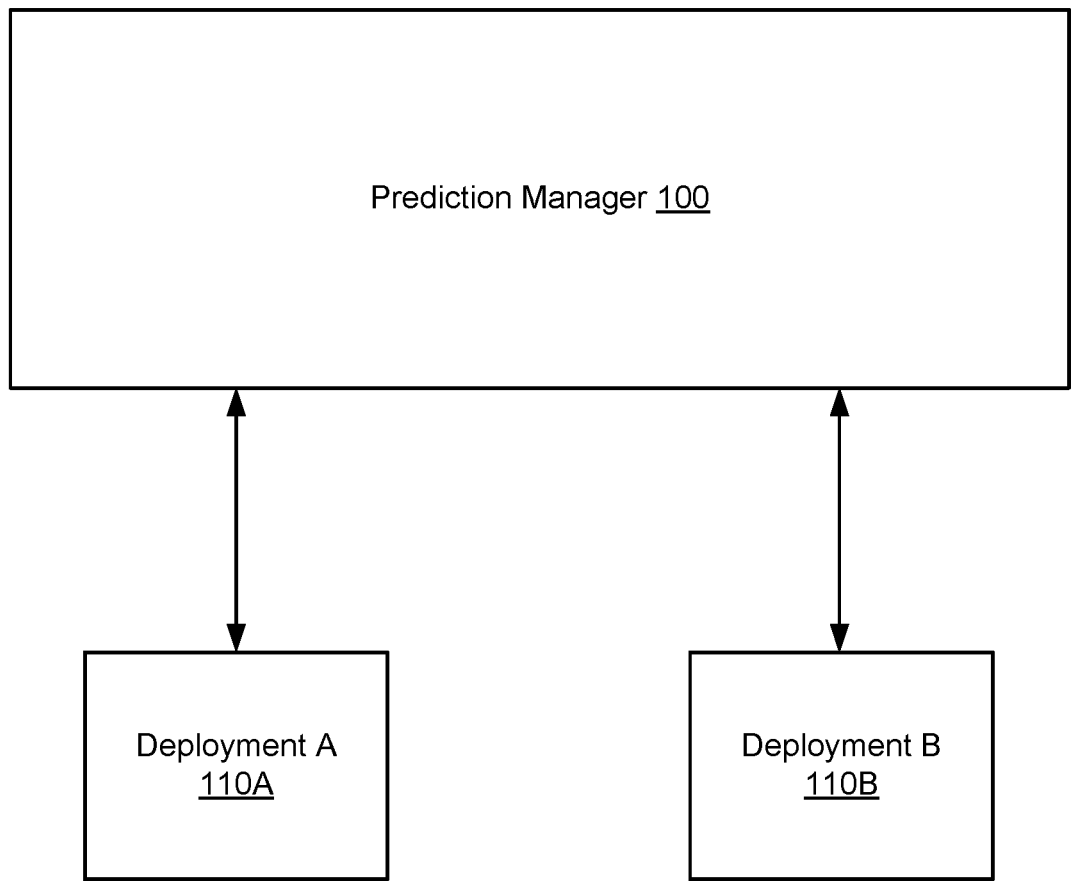
FIG. 3A shows a diagram of an example system in accordance with one or more embodiments of the invention.
Figure 3B:
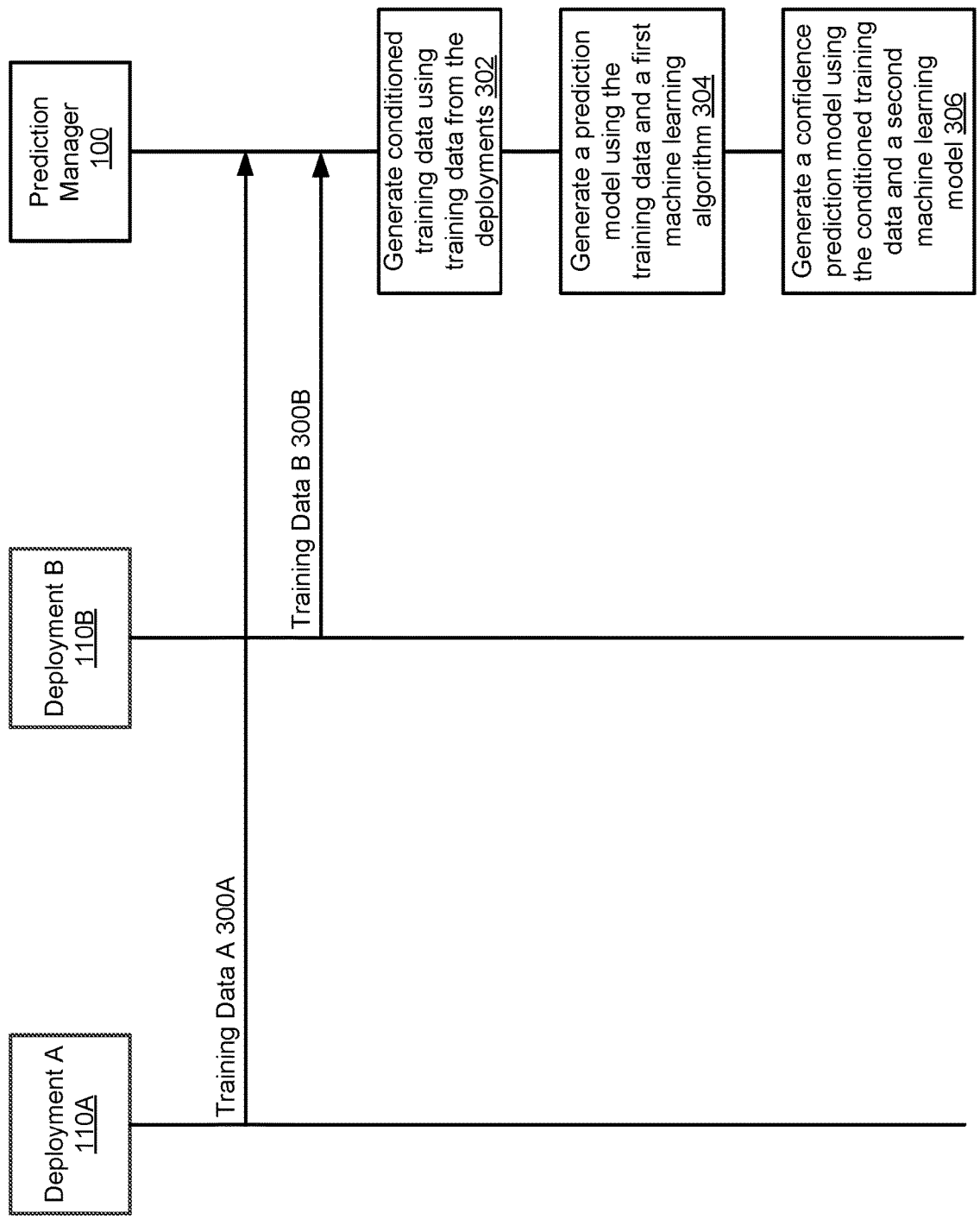
Figure 3D:
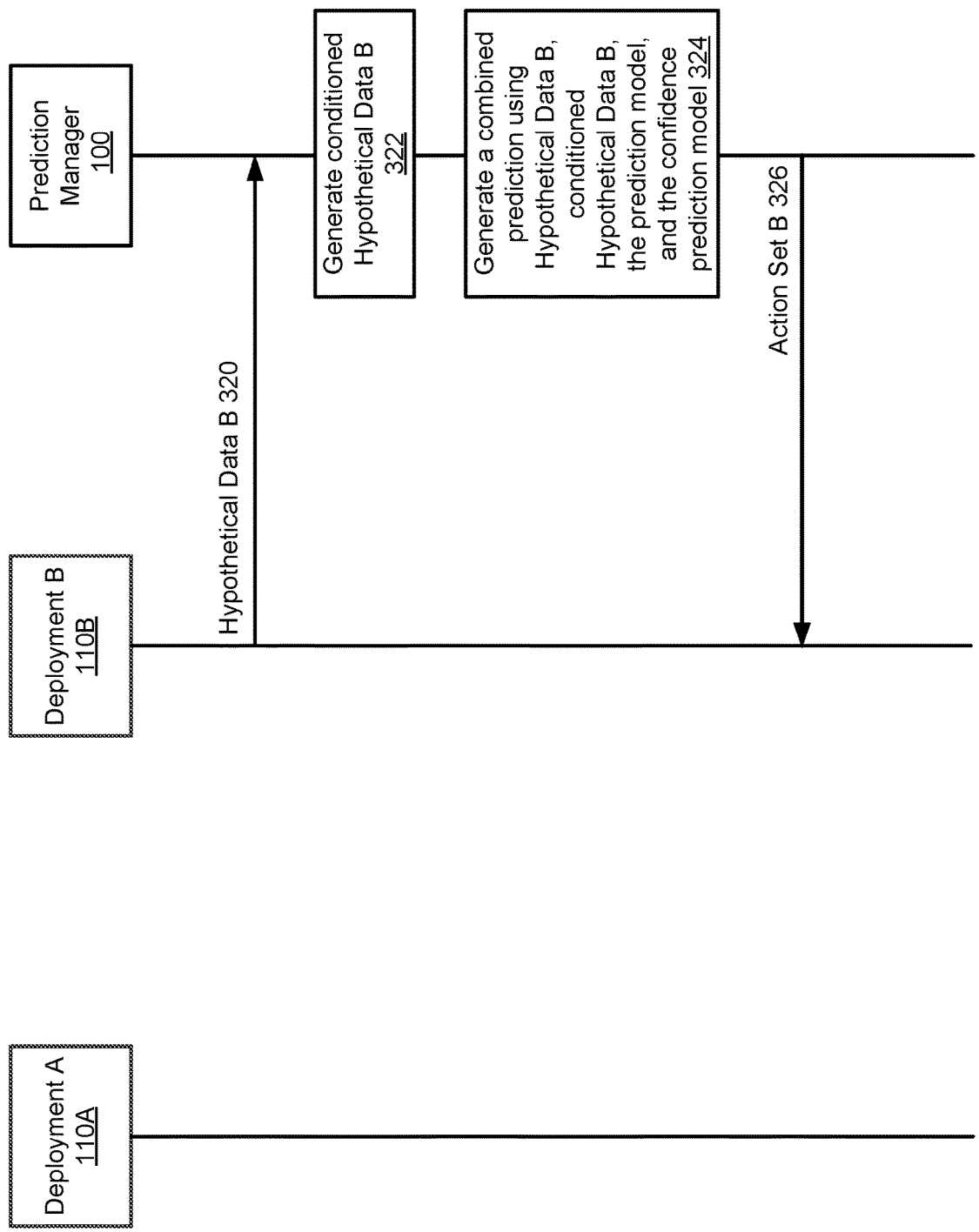

To further clarify aspects of embodiments of the invention, a non-limiting example is provided in FIGS. 3A-3D. FIG. 3A shows a diagram of an example system and FIGS. 3B-3D show diagrams of actions that may be performed by the example system of FIG. 3A. The system of FIG. 3A may be similar to that of FIG. 1A. For the sake of brevity, only a limited number of components of the system of FIG. 1A are illustrated in FIG. 3A.

Example

Consider a scenario as illustrated in FIG. 3A in which a prediction manager (100) is providing responsiveness prediction services for two deployments, deployment A (110A) and deployment B (110B). As discussed above, other components of the prediction manager (100) are not illustrated in FIGS. 3A-3D for brevity.

To provide such responsiveness prediction services, the deployments (110A and 110B) (or other entities such as a manager of the deployments) may request a responsiveness prediction from the prediction manager (100). FIG. 3B shows an interaction diagram that illustrates interactions between the prediction manager (100), deployment A (110A), and deployment B (110B).

At a first point in time, deployment A (110A) sends training data A (300A) to the prediction manager (100). Then deployment B (110B) sends training data B (300B) to the prediction manager (100). Deployment B (110B) may send training data B (300B) to the prediction manager (100) prior to deployment A (110A) sending training data A (300A) to the prediction manager (100) without departing from the invention. After obtaining training data A (300A) and training data B (300B), the prediction manager (100) generates conditioned training data using training data A and training data B obtained from the deployments (110A, 110B) (302).

Once the training data is obtained and the conditioned training data is generated, the prediction manager (100) generates a prediction model using the training data and a first machine learning algorithm (304). After generating the prediction model (304), the prediction manager (100) generates a confidence prediction model using the conditioned training data and a second machine learning algorithm (306).

After generating the prediction model and the confidence prediction model, the prediction manager (100) may then generate responsiveness predictions. FIG. 3C shows a second interaction diagram illustrating interactions between the prediction manager (100), deployment A (110A), and deployment B (110B).

Once the prediction model and the confidence prediction model are generated, the prediction manager (100) sends a hypothetical data request to deployment B (110B) (308). Then the prediction manager (100) sends another hypothetical data request to deployment A (110A) (310). The prediction manager (100) may send a hypothetical data request to deployment A (110A) prior to sending a hypothetical data request to deployment B (110B) without departing from the invention.

Upon receiving the hypothetical data request from the prediction manager (100), deployment A (110A) generates and sends hypothetical data A to the prediction manager (100) (312). After receiving the hypothetical data A from deployment A (110A), the prediction manager (100) generates conditioned hypothetical data A (314). After obtaining hypothetical data A and generating conditioned training data A, the prediction manager (100) generates a combined prediction using hypothetical data A, conditioned hypothetical data A, the prediction model, and the confidence prediction model (316). Based on the combined prediction, the prediction manager (100) sends a message to deployment A (110A) that initiates an action set A (318).

After generating a responsiveness prediction for deployment A (110A), the prediction manager may generate a responsiveness prediction for deployment B (110B). FIG. 3D shows a third interaction diagram between the prediction manager (100), deployment A (110A), and deployment B (110B).

Upon receiving the hypothetical data request from the prediction manager (100), deployment B (110B) generates and sends hypothetical data B to the prediction manager (100) (320). After receiving the hypothetical data B from deployment B (110B), the prediction manager (100) generates conditioned hypothetical data B (322). After obtaining hypothetical data B and generating conditioned hypothetical data B, the prediction manager generates a combined prediction using hypothetical data B, conditioned hypothetical data B, the prediction model, and the confidence prediction model (324). Based on the combined prediction, the prediction manager (100) sends a message to deployment B (110B) initiates an action set B (326).

The prediction manager (100) may obtain hypothetical data B, generate conditioned hypothetical data B, generate a combined prediction using hypothetical data B and conditioned hypothetical data B, and initiate action set B prior to obtaining hypothetical data A, generating conditioned hypothetical data A, generating a combined prediction using hypothetical data A and conditioned hypothetical data A, and initiating action set A without departing from the invention.

End of Example

Thus, as illustrated in FIGS. 3A-3D, embodiments of the invention may provide a method for predicting responsiveness of deployment configurations. By predicting such deployment configuration response times, deployment responsiveness may be improved and responsiveness requirements may be met.

Figure 4:
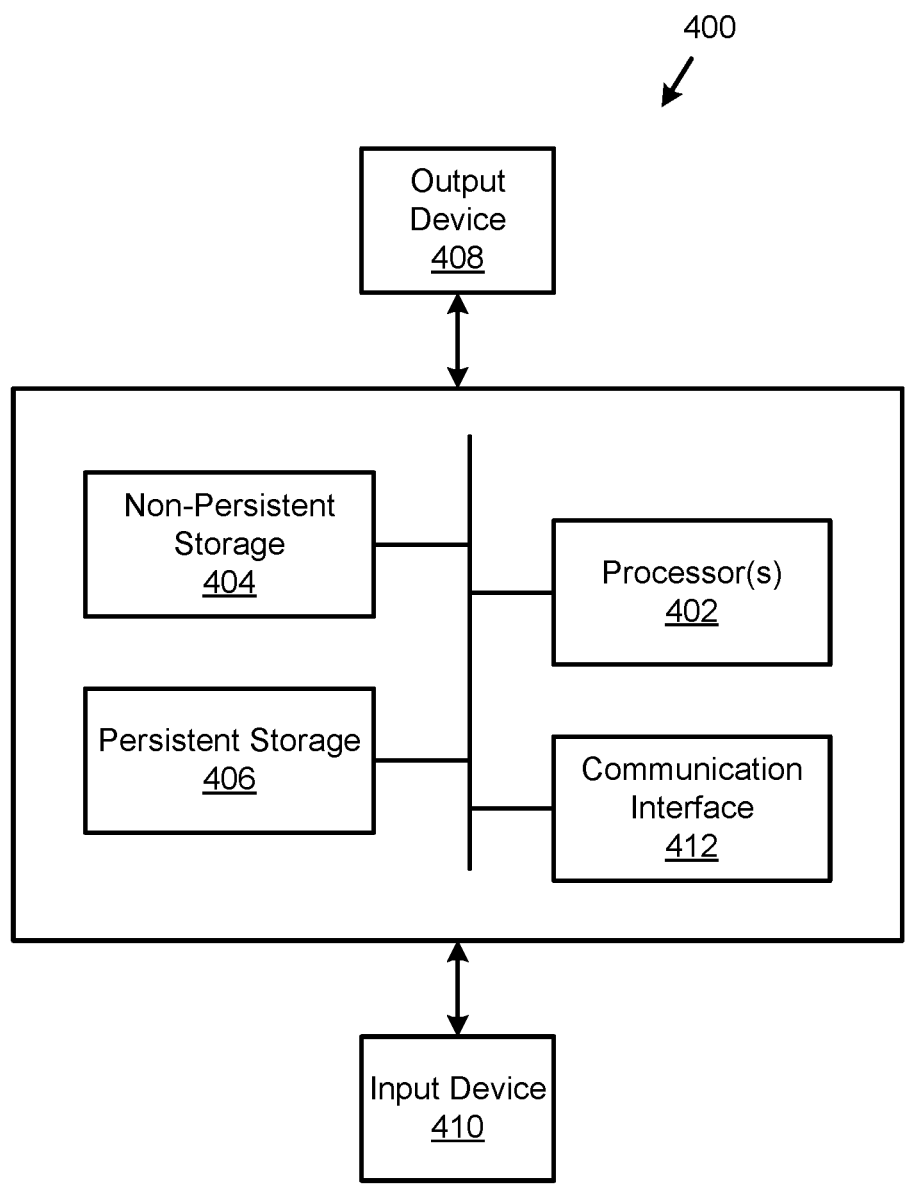
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a computationally and reliable method of predicting responsiveness of hypothetical deployment configurations. By making such predictions, the deployment configuration responsiveness may be improved and hypothetical deployment configurations may be tested to ensure they meet responsiveness requirements.

To make predictions of future storage failures, embodiments of the invention may utilize a multiphase prediction process. In a first phase, the method may utilize large amounts of data from numerous sources and perform peak extraction analysis on the data to generate conditioned data. The data may be used to generate a first prediction framework (e.g., a first trained machine learning model). After generating the first prediction framework, the method may use the conditioned data to generate a second prediction framework (e.g., a second trained machine learning model) that utilizes data divided into data two portions associated with peaks and non-peaks respectively. For example, using the first prediction framework, a high response time prediction may be generated, and using the second prediction framework, a confidence indicator prediction may indicate that the response time prediction is likely a peak response and confirm the prediction generated by the first prediction framework. Based on the high response time prediction of the first prediction framework and the confidence indicator prediction indicating that the predicted response time is likely a peak, a combined prediction may be generated that indicates the predicted response time reliable. By doing so, embodiments of the invention may provide methods and systems for generating confident responsiveness predictions at a higher degree of accuracy than contemporary methods.

Thus, embodiments of the invention may address the problem of computational prediction reliability by increasing the computational sensitivity for generating responsiveness predictions.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A prediction manager for providing responsiveness predictions for deployments, comprising:
   storage for storing training data;
   a predictor programmed to:
      obtain the training data based on:
         a configuration of at least one deployment of the deployments, and
         a measured responsiveness of the at least one deployment;
      perform a peak extraction analysis on the measured responsiveness to obtain conditioned training data;
      obtain a prediction model using:
         the training data, and
         a first untrained prediction model;
      obtain a confidence prediction model using:
         the conditioned training data, and
         a second untrained prediction model;
      obtain a combined prediction using:
         the prediction model, and
         the confidence prediction model, wherein the combined prediction specifies:
            a predicted response time for storage resources of the at least one deployment, and
            at least one confidence indicator for the predicted response time;
      make a determination that the at least one confidence indicator falls below a minimum confidence threshold; and
      perform, based on the combined prediction determination, an action set to prevent a responsiveness failure.

2. The prediction manager of claim 1, wherein the prediction model relates hypothetical configurations of the deployments and the responsiveness predictions.

3. The prediction manager of claim 2, wherein the confidence prediction model relates the hypothetical configurations and confidence indicators associated with the responsiveness predictions.

4. The prediction manager of claim 3, wherein the combined prediction is obtained using a hypothetical configuration of the hypothetical configurations as input to:
   the prediction model, and
   the confidence prediction model.

5. The prediction manager of claim 1, wherein performing the peak extraction analysis on the measured responsiveness to obtain the conditioned training data comprises:
   identifying at least one feature in the measured responsiveness that is obscured from the first untrained prediction model; and
   adding the at least one feature to the conditioned training data.

6. A method for providing responsiveness predictions for deployments, comprising:
   obtaining training data based on:
      a configuration of at least one deployment of the deployments, and
      a measured responsiveness of the at least one deployment;
   performing a peak extraction analysis on the measured responsiveness to obtain conditioned training data;
   obtaining a prediction model using:
      the training data, and
      a first untrained prediction model;

obtaining a confidence prediction model using:
  the conditioned training data, and
  a second untrained prediction model;
obtaining a combined prediction using:
  the prediction model, and
  the confidence prediction model, wherein the combined prediction specifies:
    a predicted response time for storage resources of the at least one deployment, and
    at least one confidence indicator for the predicted response time;
  making a determination that the at least one confidence indicator falls below a minimum confidence threshold; and
  performing, based on the combined prediction determination, an action set to prevent a responsiveness failure.

7. The method of claim 6, wherein the prediction model relates hypothetical configurations of the deployments and responsiveness predictions.

8. The method of claim 7, wherein the confidence prediction model relates the hypothetical configurations and confidence indicators associated with the responsiveness predictions.

9. The method of claim 8, wherein the combined prediction is obtained using a hypothetical configuration of the hypothetical configurations as input to:
  the prediction model, and
  the confidence prediction model.

10. The method of claim 6, wherein performing the peak extraction analysis on the measured responsiveness to obtain the conditioned training data comprises:
  identifying at least one feature in the measured responsiveness that is obscured from the first untrained prediction model; and
  adding the at least one feature to the conditioned training data.

11. A non-transitory computer readable medium comprising computer readable program code, which when executed by a computer processor enables the computer processor to perform a method for providing responsiveness predictions for deployments, the method comprising:
  obtaining training data based on:
    a configuration of at least one deployment of the deployments, and
    a measured responsiveness of the at least one deployment;
  performing a peak extraction analysis on the measured responsiveness to obtain conditioned training data;
  obtaining a prediction model using:
    the training data, and
    a first untrained prediction model;
  obtaining a confidence prediction model using:
    the conditioned training data, and
    a second untrained prediction model;
  obtaining a combined prediction using:
    the prediction model, and
    the confidence prediction model, wherein the combined prediction specifies:
      a predicted response time for storage resources of the at least one deployment, and
      at least one confidence indicator for the predicted response time;
  making a determination that the at least one confidence indicator falls below a minimum confidence threshold; and
  performing, based on the combined prediction determination, an action set to prevent a responsiveness failure.

12. The non-transitory computer readable medium of claim 11, wherein the prediction model relates hypothetical configurations of the deployments and responsiveness predictions.

13. The non-transitory computer readable medium of claim 12, wherein the confidence prediction model relates the hypothetical configurations and confidence indicators associated with the responsiveness predictions.

14. The non-transitory computer readable medium of claim 13, wherein the combined prediction is obtained using a hypothetical configuration of the hypothetical configurations as input to:
  the prediction model, and
  the confidence prediction model.

* * * * *